D. G. LITTLEFIELD.
Hot Air Furnace.
No. 1,303.
Reissued April 22, 1862.
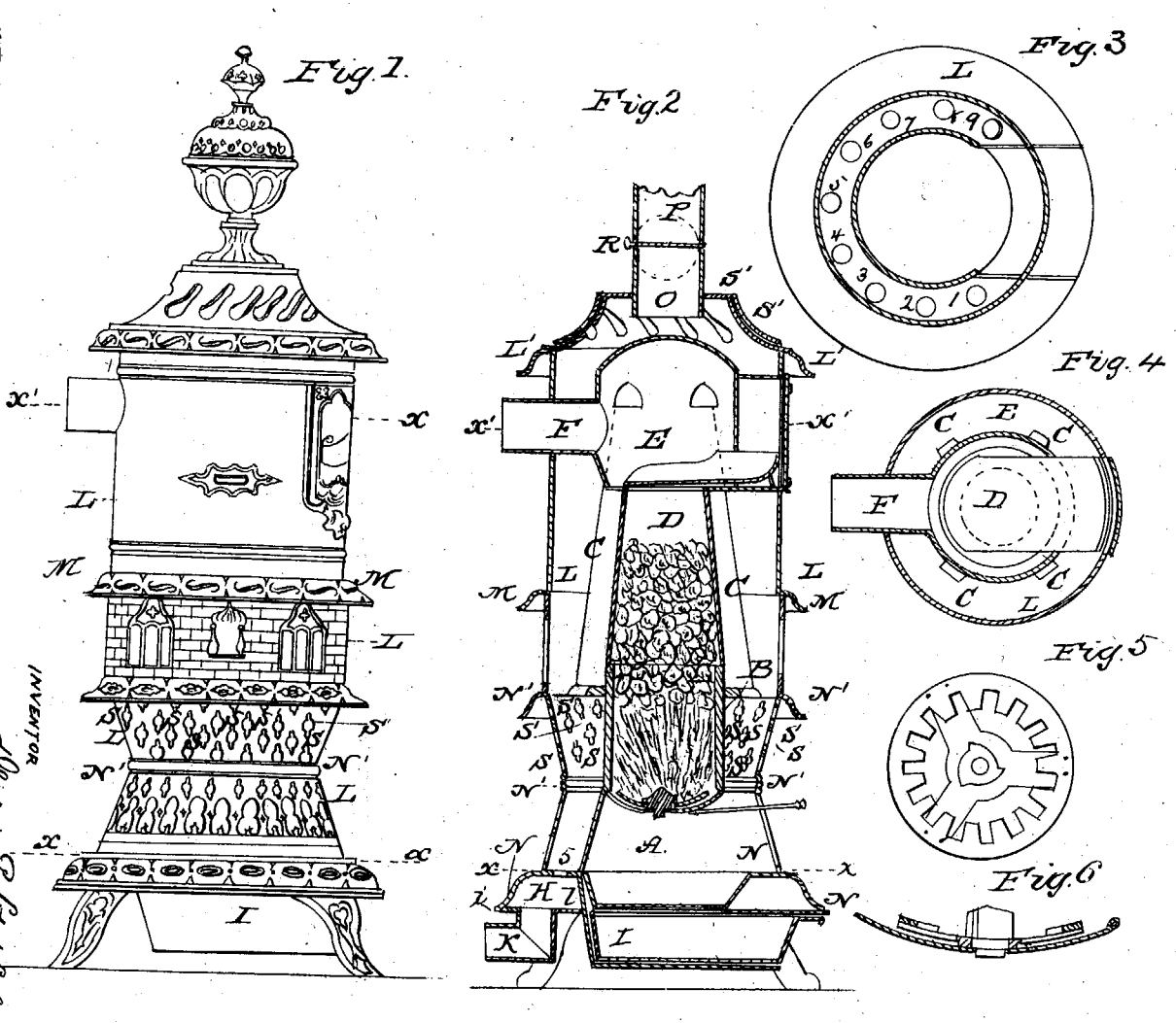
WITNESSES
Gustavus Dieterich
R. S. Cobb
INVENTOR
Dennis P. Litsk Kelly
Dewitt C. Laurent by
Robert W. Fenwick,
his Attys
N. PETERS, Photo-Lithographer, Washington, D. C.

UNITED STATES PATENT OFFICE.

DENNIS G. LITTLEFIELD, OF ALBANY, NEW YORK.

IMPROVEMENT IN HOT-AIR FURNACES.

Specification forming part of Letters Patent No. 30,333, dated October 9, 1860; antedated July 3, 1860; Reissue No. 1,303, dated April 22, 1862.

*To all whom it may concern:*

Be it known that I, DENNIS G. LITTLEFIELD, of Albany, in the county of Albany and State of New York, have invented a new and Improved Mode of Constructing Hot-Air Furnaces, by which they are more perfectly adapted for a parlor-furnace, as well as for a double heating-furnace; and I do hereby declare that the following is a full and exact description thereof, reference being had to the accompanying drawings, and to the letters of reference marked thereon, like letters in the several figures indicating the same parts.

For a proper definition of the words "stove" and "furnace" we must have resort to what is understood as the meaning of these terms by persons who use the devices said terms represent.

A stove, as distinguished from a furnace, is a receptacle for burning fuel, which radiates its heat direct from its surfaces to the room to be warmed.

A furnace is a similar receptacle, placed within and surrounded by a covering placed a space apart from the stove, so as to admit the passage of a column of cold air at the base of the inclosed space to absorb the heat from the stove and transmit it to the space to be warmed.

My improvement consists in the employment of a cold-air channel (one or more) at the base, a series of perforations in the covering, opposite the most intensely heated part of the stove, and a top fixture to the covering, for the purpose of controlling the passage of the heated air, thus constituting a device that can be used as a parlor-furnace, warming the room where placed by heated air combined with direct radiation or by reverberated heat in conjunction with radiated heat, or, as a double heating-furnace, warming the room where placed by direct radiation, and rooms above by heated air.

The organization which I employ is so constructed that when used for warming close rooms the objectionable "stove smell" and oppressive and parching sensation usually experienced in rooms when thus warmed are obviated. The reason such objections are obviated in this: that while the apparatus is so organized as to compel the cold air from without immediately upon its entrance to come in direct contact with all sides of its most heated portion, it at the same time prevents the impure air within the room from coming in contact with direct such heated portion, and the consequent burning of the impurities held by it in suspension. Moreover, the objectionable qualities of the heat of direct radiation through the series of openings opposite such most heated portion are neutralized, as it were, or subdued by the heat of absorption, or heat imparted to said cold air by contact with the fire-pot at the instant of its entrance; and thus in a modified state the heat of direct radiation may be made to pass into the room at the base of the furnace, in conjunction with heated fresh air. In order to adapt a hot-air furnace to serve these purposes, I surround a stove with a covering of metal, through which the ash-pit, the mica windows, the collar for the smoke-pipe, and the feed-door project. Provision for the supply of air is made by a conductor which communicates with the external atmosphere, so that the room is supplied with a larger quantity of air to support combustion than is taken out of it for such purpose, the practical advantage of which is, that it ventilates the room in a proper manner—to wit, by giving a constant supply of pure air, in quantity sufficient to preserve a plenum, thereby preventing cold air from coming into the room through the chinks at the windows and doors leading outside, or to halls or passages where the air is cold. By such action of this furnace a uniform heat can be maintained in portions of the room most distant from it, while at the same time, a portion of the heat being radiated in a direct line from the surface of the fire-pot through the openings in that portion of the covering surrounding it, the space near the furnace is made warm by direct radiation, so that persons coming in from "outdoors" can warm their feet and hands the same as by a stove.

By this organization it will also be seen that when the weather is very cold, and it is desirable to get up a quick heat about the furnace or when the furnace is being put in operation in a room that is cold, the operator can, by closing the damper R and register S′, concentrate the heat to a space immediately about the furnace, until such space is warm, after which, by throwing open the register, the whole space of the room may be warmed uniformly; or he may without opening the register open the damper, and by the conductor P convey currents of heated air to warm rooms above. Thus the damper for the center outlet to the room above, the register on top of the covering as an outlet for the heated air to the room in which the furnace is situated, and the openings in the covering surrounding the fire-pot enable the operator to apply the heat to such points as required. These capabilities or functions may all be brought into action when the furnace is adapted as a double heating-furnace, but when adapted as a parlor-furnace, warming only the room in which it is situated, the damper is dispensed with, and a cover, or urn, as shown in Figure 1, takes its place, in which case the currents of heated air are wholly controlled by the register.

My apparatus thus becomes a perfect adaptation for use either as a parlor-furnace, warming only the room where situated, or as a double heating-furnace, warming the room where situated and one or more rooms above and separate from the one where situated.

In adopting my improvement any stove of the well-known forms may be used; but I prefer that class of stoves known as "base-burning."

In the accompanying drawings, Fig. 1 is a side elevation as used for a parlor-furnace; Fig. 2, a longitudinal vertical section as used for a double heating-furnace; Fig. 3, a horizontal section on the line *x x* of Fig. 1; Fig. 4, a horizontal section on the line *x′ x′* of Figs. 1 and 2; Fig. 5, a plan of the grate at the base of the fire-pot; Fig. 6, a vertical section of Fig. 5.

In said drawings, A indicates the ash-pit; B, the fire-pot; C, the flues; D, the magazine for the supply-coal; E, the upper chamber, through which the fuel is passed to the magazine, and F the collar for the smoke-pipe of a base-burning stove. The base N may be of the common form, having a series of perforations, 1 2 3 4 5 6 7 8 9, or more, if necessary, to distribute the cold air which comes in through the inlet K around the fire-pot B. Beneath this base a channel, H, or cold-air passage is formed by a flat plate of iron, *l*, extending from its outer edge, as at *i*, to the ash-pan case I. This plate, when bolted to the lower side of the base, forms the cold-air channel H, which is provided with an inlet-pipe, K, to which an air-conductor may be applied to communicate with the external atmosphere. L is the outer covering, which is made of cast-iron from the base to M, above which it is made of sheet-iron. From the base N to the point N′ the covering is contracted for the purpose of causing the cold air, as it ascends from the orifices 1 2 3 4 5 6 7 8 9 in the base, to impinge against the fire-pot, and also for the purpose of carrying the lattice covering or perforations S nearer the fire-pot, in order that the direct radiations may find more ready egress from the fire-pot to the room. The top of the covering at L′ is made of cast-iron and perforated, as shown in the drawings, and has a cast plate, S′, also perforated, and fitted thereon so as to form a register to regulate the escape of the currents of heated air into the room in which the furnace is situated.

For the purpose of carrying the heated air to the rooms above, a central opening, O, is provided in the top of the covering, the perforated register-plate S′ turning around it, from which opening a pipe, P, projects, having a damper, R, to prevent the passage of heat to the upper rooms whenever it is desirable to apply all the heat of the furnace to the room in which it is placed. The dotted lines represent the damper open; but when closed, as shown in Fig. 2, the current of heated air reverberates as represented in red arrows, and passes out by the register, if the same be open; or, if closed, the whole covering becomes highly heated, yet the stove within is prevented from being destroyed by overheating, owing to the relief afforded by the outlets S for the escape of the reverberated heat opposite the fire-pot. Again, by closing the register S′ more or less, as occasion may require, more or less of the heated air will be reverberated outside the fire-pot, or pass by the register S′ to the room in which the furnace is placed. If the register be entirely closed, (the damper being also closed,) an intense heat, which is sometimes desirable, may be generated around the furnace, the reverberated heat in such case passing out as a back or return current through openings S, and into the room, near the floor, in conjunction with the heat of direct radiaton from the fire-pot itself, and also the heated fresh air which in a cold state comes up through the fixture K; and if, on the other hand, the damper be opened and the register closed, almost the entire heat, except that radiated directly from the fire-pot through the lattice perforations, will be carried into the room above.

It will thus be seen that the organization which I have described may be used as a double heating-furnace, warming rooms above by a current of heated air, and the room where situated by direct radiation; and when thus adapted, at the will of the operator, can be made to apply all its heat to the room in which it is situated, either by reverberated heat, combined with radiated heat from the fire-pot, or by radiated heat from the fire-pot and heated air passing from the top of the furnace to said room, or that it may be adapted and used solely as a parlor-furnace, warming the said room by direct radiation through the lattice perforations, while heated air is passing from its top into the upper part of the room, or when desirable by direct radiation in conjunction with reverberated heat, commingled with an ascending atmospheric current, the register being closed.

Having thus described my invention, what I claim as new, and desire to secure by Letters Patent of the United States, is—

1. The combination of the cold-air channel H, the perforations S S S S, the register S′, and the damper R, as described.

2. Combining in hot-air furnaces the shell or covering L, the register S′, for opening and closing the top of the shell, as set forth, the perforations S S S S, opposite or near the fire-pot, and the cold-air channel H, substantially as above described.

DENNIS G. LITTLEFIELD.

Witnesses:
G. A. HAWLEY,
PHILIP FITZSIMONS.